June 2, 1931.   H. S. HELE-SHAW   1,808,262
PIPE JOINT
Filed June 5, 1930

Inventor
Henry Selby Hele-Shaw
By Bealer Park
Attys

Patented June 2, 1931

1,808,262

UNITED STATES PATENT OFFICE

HENRY SELBY HELE-SHAW, OF LONDON, ENGLAND, ASSIGNOR TO VICTAULIC COMPANY LIMITED, OF LONDON, ENGLAND

PIPE JOINT

Application filed June 5, 1930, Serial No. 459,374, and in Great Britain November 30, 1929.

This invention relates to pipe joints of that character where the pressure within the pipes acts upon flanges and tends to keep the joint leakproof.

In pipe joints of this character where an elastic ring is provided with flexible flanges which embrace the ends of the pipes to be joined in such a manner that the pressure within the pipes acting on the flanges tends to keep them leakproof it has been found in practice that there is a tendency for the flanges to take a permanent set and it has been suggested to embed springs in the flanges but hitherto the springs suggested have been springs with open coils capable of both compression and tension. Such springs have, however, proved unsuitable and ineffective. In the first place by reason of their springiness in both directions it has been found commercially impossible to mould them in the rubber and secondly it is wrong in principle to provide a spring which tends to affect the flanges in any way before they are stretched over the pipe ends. Lastly the metal spring should come strongly into action with the slightest stretching, the rubber casing being merely a leak proof flexible covering.

It has been proved by experiment that the use of a spring which not merely has its coils close together so that it cannot be shortened in length but these coils are forced together by appreciable elastic force so that it can only be elongated, ensures an effective and tight embracing of the pipe ends under all conditions. Such a spring may be called a "reflex" spring to distinguish it from an ordinary tension or compression spring. The present invention consists of a pipe joint of the type provided with an elastic ring having inturned flanges upon which the pressure within the pipe acts when the joint is in situ on the pipe, characterized in that there is applied to each of the flanges of the pipe a reflex spring capable of elongating under tension but incapable of being shortened. Thus the spring can be inserted in a mould in a "dead" condition and will remain in that condition when the rubber coating is soft before being vulcanized. It will be ineffective as a spring until the flanges of the joint are stretched over the pipe whereupon the spring comes into action as an effective agent in causing the rubber or other coating to grip the pipe and operate to make a leak proof joint. This is effected by what is in theory the relative displacement of the zero points of the two diagrammatic elasticity curves viz: that of the spring and that of the rubber coating.

Figure 1:
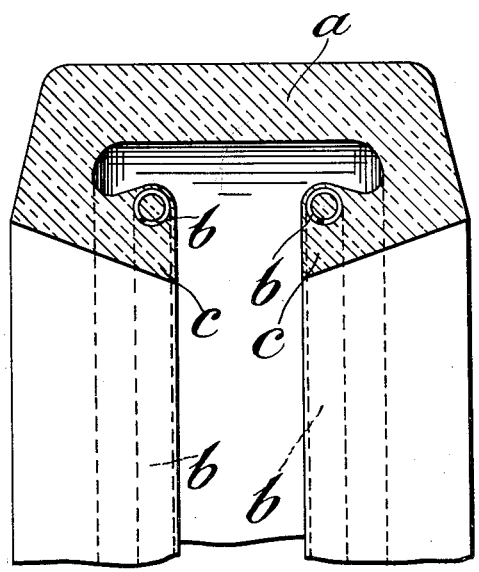
Figure 2:
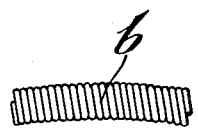

A joint in accordance with the invention is illustrated in the accompanying drawings, Figure 1 being a section of a ring joint constructed in accordance with the invention and Figure 2 shows a short length of the special spring employed.

Referring to the drawings $a$ designates the ring joint which is preferably of rubber or like material and $b$ are the springs which are moulded or otherwise embedded or caused to embrace the flanges $c$ of the joint. The springs $b$ are essentially of the form which in normal condition have their coils abutting so that they can only act as tension springs and not as compression springs.

Although it is preferred to make the ring joint of rubber or like resilient material it will be appreciated that by reason of the gripping action of the springs which come into effect immediately the flanges are stretched over the pipe ends other flexible but weakly resilient materials such as leather compositions can be made use of.

What I claim and desire to secure by Letters Patent is:—

1. A pipe joint comprising a ring of flexible material having inturned flanges adapted to embrace the pipe ends and be subjected to the pressure within the pipes and springs capable of elongation but incapable of shortening applied to the flanges of the joint.

2. A pipe joint comprising a ring of flexible material having inturned flanges adapted to embrace the pipe ends and to be subjected to the pressure within the pipes and coil springs having initial elastic pressure holding its coils in close contact with each other with appreciable force applied to each of the flanges of the joint.

3. A pipe joint comprising a ring of flexible material having inturned flanges adapted to embrace the pipe ends and to be subjected to the pressure within the pipes, and springs capable of elongation but incapable of shortening embedded in the material of the ring flanges at positions above the inner marginal edges of the flanges of the joint.

4. A moulded pipe joint comprising a ring of flexible material having inturned flanges adapted to embrace the pipe ends and to be subject to the pressure within the pipes and coiled springs having initial elastic pressure holding the coils in close contact with each other with appreciable force moulded in the flanges of the joint.

5. A moulded pipe joint comprising a ring of flexible material having inturned flanges adapted to embrace the pipe ends and to be subject to the pressure within the pipes and a coil spring in each of the flanges of the joint the turns of each of the coil springs abutting one against the other with appreciable force until the internal diameters of the flanges are increased.

In testimony whereof, I affix my signature.

HENRY SELBY HELE-SHAW.